United States Patent [19]
Goto et al.

[11] Patent Number: 5,351,277
[45] Date of Patent: Sep. 27, 1994

[54] METHOD OF CONSTRUCTING TOP SLAB OF NUCLEAR REACTOR CONTAINER AND NUCLEAR REACTOR CONTAINER CONSTRUCTED BY THE METHOD

[75] Inventors: Hiroshi Goto, Hitachi; Tadao Suzuki, Kure, both of Japan

[73] Assignee: Hitachi, Ltd., Tokyo, Japan

[21] Appl. No.: 684,981

[22] Filed: Apr. 15, 1991

[30] Foreign Application Priority Data

Apr. 13, 1990 [JP] Japan .................................. 2-98517

[51] Int. Cl.$^5$ .............................................. G21C 9/00
[52] U.S. Cl. ..................................... 376/293; 376/295; 376/296
[58] Field of Search ....................... 376/293, 295, 296

[56] References Cited

U.S. PATENT DOCUMENTS

| | | | |
|---|---|---|---|
| 4,587,081 | 5/1986 | Malaval | 376/295 |
| 4,696,790 | 9/1987 | Elter et al. | 376/296 |
| 5,119,598 | 6/1992 | Tajiri et al. | 376/293 |

FOREIGN PATENT DOCUMENTS

| | | |
|---|---|---|
| 49-111420 | 10/1974 | Japan . |
| 52-26714 | 2/1977 | Japan . |
| 56-125691 | 10/1981 | Japan . |
| 57-19696 | 2/1982 | Japan . |
| 57-57289 | 4/1982 | Japan . |
| 59-142496 | 8/1984 | Japan . |
| 62-165185 | 7/1987 | Japan . |
| 62-169082 | 7/1987 | Japan . |
| 62-170885 | 7/1987 | Japan . |
| 62-273347 | 11/1987 | Japan . |
| 62-298794 | 12/1987 | Japan . |
| 64-74498 | 3/1989 | Japan . |
| 6479693 | 3/1989 | Japan . |

Primary Examiner—Donald P. Walsh
Assistant Examiner—Frederick H. Voss
Attorney, Agent, or Firm—Antonelli, Terry, Stout & Kraus

[57] ABSTRACT

A method of constructing the top slab of a nuclear reactor container in which a flange for mounting the top head of the container is prepared separately from the sleeve of the container. When the outside diameter of the flange is greater than the inside diameter of a doughnut-shaped steel; reinforcement structure assembled on the container, the steel reinforcement structure is situated in place and then the flange is welded to the sleeve, thus shortening the construction period. Disclosed also is a nuclear reactor container constructed by this method.

8 Claims, 8 Drawing Sheets

METHOD OF CONSTRUCTING TOP SLAB OF NUCLEAR REACTOR CONTAINER AND NUCLEAR REACTOR CONTAINER CONSTRUCTED BY THE METHOD

BACKGROUND OF THE INVENTION

1. Field of the Invention

The present invention relates to a method of constructing the top slab of a steel-reinforced concrete nuclear reactor container in a nuclear power generating plant and also to a nuclear reactor container constructed by such a method.

2. Description of the Related Art

A known construction method will be described with reference to FIG. 5 which shows the construction of a nuclear reactor container made of steel-reinforced concrete, FIG. 6 which is an illustration of a top slab portion of the nuclear reactor container, illustrative of the conventional construction method and FIG. 7 which is a flow chart of the known construction method.

The nuclear reactor container made of steel-reinforced concrete has a bottom-equipped cylindrical portion 2, a top slab 4 and a top head 5. The interior of the container is divided into two spaces by a diaphragm floor 3. The nuclear reactor container contains a pressure vessel 6 of a nuclear reactor and forms a portion of a nuclear reactor house 1.

The known construction method will be described with specific reference to FIGS. 6 and 7. After mounting a liner 11 for the cylindrical portion, temporary posts 14 and temporary trusses 15 are installed and a top slab liner 10 is placed on the top of the temporary trusses 15. A flanged sleeve 7 of the nuclear reactor container is set up and welding is conducted at the welding lines 12 and 13. Then, doughnut-shaped top slab reinforcers 8 are assembled on the top slab liner 10. Subsequently, the reinforcers 9 for the cylindrical portion are set up and connected to the top slab reinforcers 8. Then, a concrete is poured and, after drying and solidification of the concrete, the temporary posts 14 and the temporary trusses 15 are removed.

Arts pertaining to this known construction method are: a method of constructing a cylindrical liner (Japanese Patent Laid-Open No. 62-170885), a method in which beams are extended through a steel-reinforced concrete top slab forming the upper structure of a nuclear reactor core, the beams being connected to a lining (Japanese Patent Laid-Open No. 62-165185), a non-unitizing top slab installation method (Japanese Patent Laid-Open No. 62-169082), an art relating to liner structure of cylindrical a portion of a reactor container (Japanese Patent Laid-Open No. 62- 298794), and a method of laying steel reinforcers (Japanese Patent Laid-Open No. 64-74498).

The following arts are also proposed: a hollow precast slab incorporating steel reinforcement beams and a method of producing the same (Japanese Patent Laid-Open No. 49-111420), a method of constructing a floor using a deck plate in place of a frame (Japanese Patent Laid-Open No. 52-26714), a method of constructing an intermediate slab of a base structure of nuclear 2 reactor for supporting a nuclear reactor pressure vessel (Japanese Patent Laid-Open No. 56-125691), a method in which an H-shaped steel is attached to each side of a lining for a concrete container (Japanese Patent Laid-Open No. 57-19696), a method in which works such as attaching of trays with ceilings, ducts, pipes and supporting structures are to deck beams and set-up of pipes to upper side of beams are conducted in a factory thus unitizing ceiling deck plate (Japanese Patent Laid-Open No. 57-57289), a method of lining the side wall of a reactor container made of steel-reinforced concrete, wherein the liner is integrated with steel reinforcers (Japanese Patent Laid-Open No. 59-142496), a method in which pipes to be buried in the floor of a reactor house are assembled in steel reinforcer units (Japanese Patent Laid-Open No. 62-273347), and a method in which steel reinforcers of a cylindrical portion of a shield wall is assembled from a plurality of units (Japanese Patent Laid-Open No. 64-79693).

In these known arts, however, no consideration has been given to the efficiency in constructing a nuclear reactor container having a sleeve with a flange of an outside diameter which is greater than the inside diameter of a doughnut-shaped steel-reinforced structure. This problem has caused an impediment in constructing a nuclear reactor container.

SUMMARY OF THE INVENTION

Accordingly, an object of the present invention is to provide a method of constructing the top slab of a nuclear reactor container which can shorten the period of work even when the container has a sleeve with a flange of an outside diameter greater than the inside diameter of a doughnut-shaped steel reinforcement structure, as well as a nuclear reactor container constructed by such a method.

To this end, according to one aspect of the present invention, there is provided a method of constructing the top slab of a nuclear reactor container, comprising the steps of: placing a container sleeve without a flange at a position where the top slab is to be constructed; lifting a prefabricated doughnut-shaped steel reinforcement structure and placing this structure at a position where it forms the top slab; and welding a flange for mounting a top head of the container to the sleeve.

Preferably, the prefabricated doughnut-shaped steel reinforcement structure has an auxiliary plate integrated therewith and located so as to face the flange of the container after the welding of the flange.

It is also preferred that the welding of the flange and the sleeve is conducted simultaneously with placement of concrete in the space next to the space between the auxiliary plate and the container sleeve followed by placement of concrete in the space defined by the auxiliary plate, the flange and the sleeve.

The invention also provides a method of constructing the top slab of a nuclear reactor container, comprising the steps of: prefabricating a structure integrating a top slab liner, a container sleeve fixed to the inner periphery of the top slab liner substantially orthogonal to the top slab liner, and a doughnut-shaped steel reinforcement structure on the top slab liner, and lifting and mounting the prefabricated structure to a position where the top slab is to be constructed; and welding a flange for mounting a top head of the container to the container sleeve.

Preferably, the prefabricated doughnut-shaped steel reinforcement structure has an auxiliary plate integrated therewith and located near the innermost circumference of the doughnut-shaped steel reinforcement structure.

It is also preferred that the welding of the flange to the container sleeve is conducted simultaneously with placement of concrete in the space which is on the opposite side of the auxiliary plate to the flange and the container sleeve, followed by placement of concrete in the space defined by the auxiliary plate, the flange and the container sleeve.

According to another aspect of the present invention, there is provided a nuclear reactor container, comprising: a bottom-equipped cylindrical portion for containing a nuclear reactor therein; a top slab provided on the top of the cylindrical portion and composed of a doughnut-shaped steel reinforcement structure and concrete placed integrally with the steel reinforcement structure, the top slab having a central bore; a sleeve outlining in the central bore of the flange and a flange fixed by welding to the sleeve and having an outside diameter greater than the inside diameter of the doughnut-shaped steel reinforcement structure; and a top head attached to the flange.

Preferably, the steel reinforcement structure has an auxiliary plate located near the innermost circumference of the doughnut-shaped steel reinforcement structure.

According to the invention, the flange portion is formed separately from the sleeve and is then fixed to the sleeve by welding. In the case where the outside diameter of the flange is greater than the inside diameter of the doughnut-shaped steel-reinforced structure, the flange can be welded to the sleeve after installation of the steel reinforcement structure, so that the term of construction work can be greatly shortened.

According to the invention, it is also possible to integrate the steel reinforcement structure of the top slab, top slab liner and the sleeve and to install this integral structure as a unit. This eliminates the necessity for temporary trusses and, hence, further contributes to improvement in the efficiency of the construction work.

According to the present invention, the sleeve and the flange are split so that the installation of the above-mentioned integral structure is facilitated. A cylindrical auxiliary plate, while strengthening the steel-reinforced prefabricated structure so as to prevent any deformation of the prefabricated structure during installation of the same, also prevents hiding the welding line between the flange and the container sleeve by concrete, thus enabling welding and inspecting of the weld to be executed simultaneously with the placement of concrete in a space on the outer diameter side of the cylindrical auxiliary plate. After flange and the container sleeve is welded, the concrete is placed in the space between the cylindrical auxiliary plate and the container sleeve.

DESCRIPTION OF THE PREFERRED EMBODIMENTS

Figure 1:
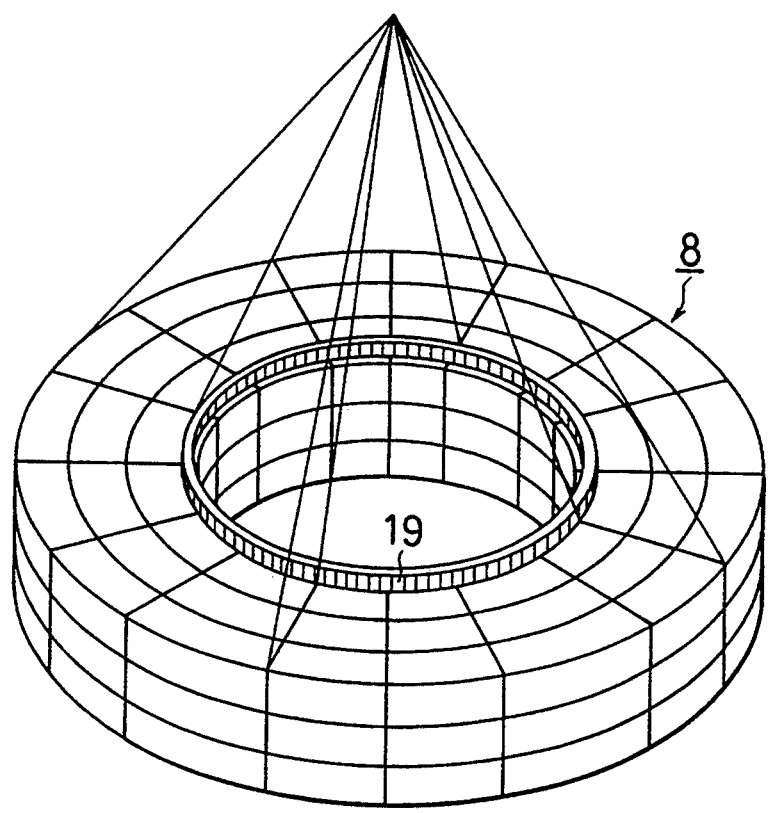
FIG. 1 is a perspective view of a prefabricated top slab steel reinforcement structure used in an embodiment of the present invention.

An embodiment of the present invention will be described with reference to FIGS. 1, 2 and 3.

Figure 2:
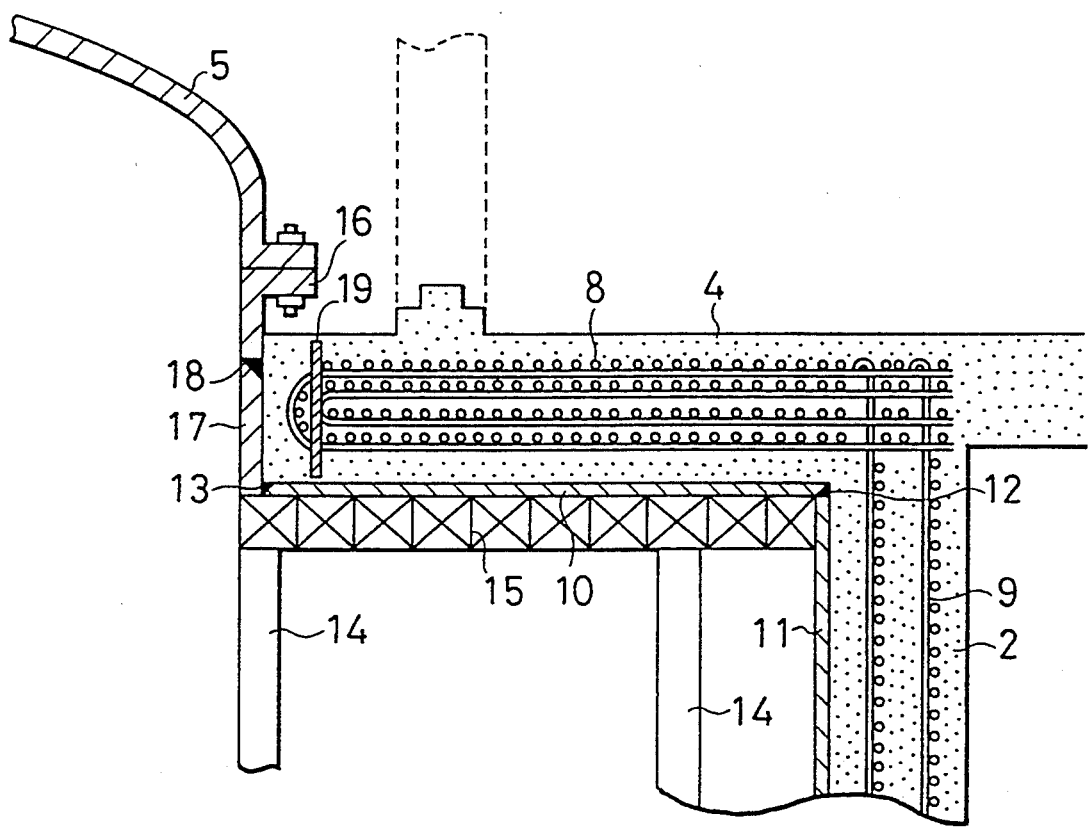
FIG. 2 is a vertical sectional view of a top slab structure in an embodiment of the nuclear reactor container of the present invention.
Figure 3:
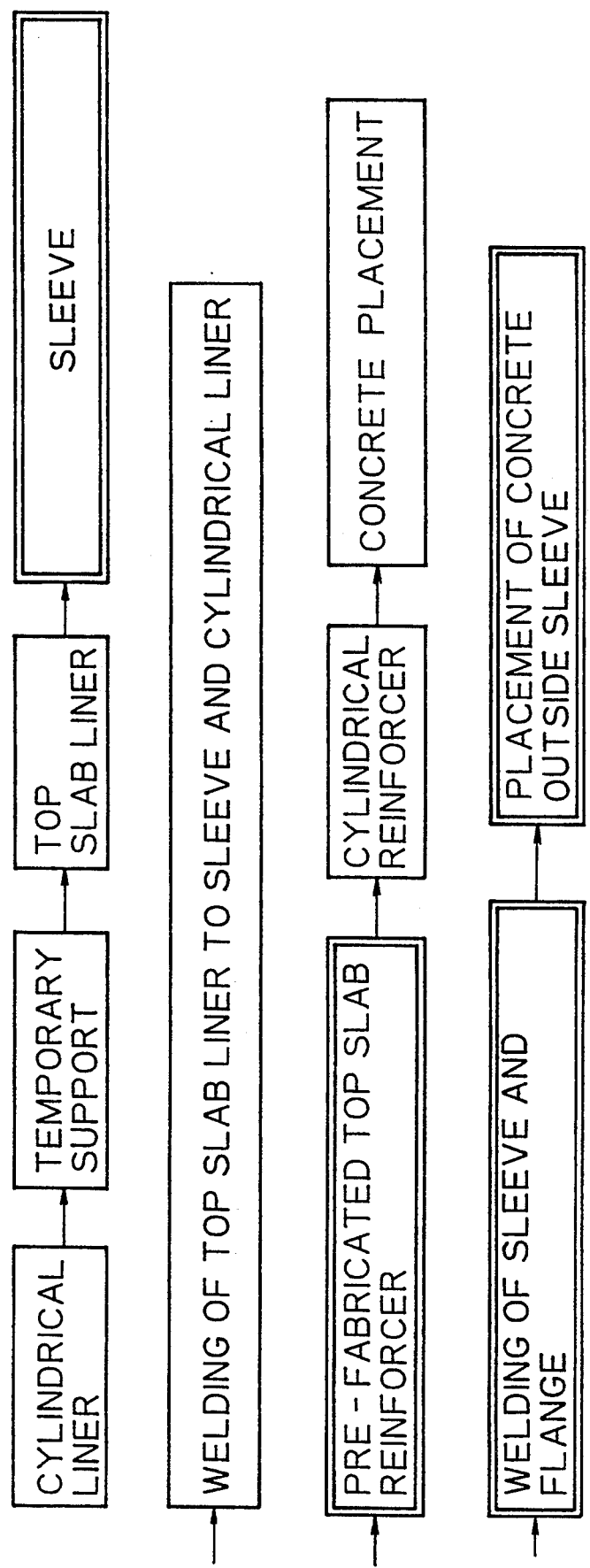
FIG. 3 is a flow chart illustrating an embodiment of the construction method of the present invention.

Referring to FIG. 2, after setting a cylindrical liner 11, temporary posts 14 and temporary trusses 15 are placed and a top slab liner 10 is laid on the temporary trusses 15, followed by setting of a sleeve 17 of the nuclear reactor container. Then, the cylindrical liner 11 and the top slab liner 10 are welded along a welding line 12. Subsequently, the top slab liner 10 and a sleeve 17 of the nuclear reactor container are welded together along a welding line 13. Meanwhile, a top slab steel reinforcement structure 8 (see FIG. 1) is prefabricated on the ground together with an auxiliary plate 19. The prefabricated top slab steel reinforcement structure 8 is lifted and set on the top slab liner 10. Then, a flange 16 and the sleeve 17 are welded together along a welding line 18. This welding is conducted simultaneously with the placement of concrete in the space on the outer diameter side of the auxiliary plate. After examination of the welding at the welding line 18, concrete is placed in the space defined by the integrated flange 16 and the sleeve 17, and the auxiliary plate 19.

In an embodiment in which the top slab steel reinforcement structure 8 is integrated with the top slab liner 10, the top slab liner 10 serves as a reinforcer, so that the temporary trusses 15 shown in FIG. 2 can be eliminated.

A further improvement in the efficiency of the construction work can be attained by integrating the top slab steel reinforcement structure 8, top slab liner 10 and the sleeve 17 of the nuclear reactor container, in advance of the installation. An embodiment which uses such an integrated structure is shown in FIG. 4.

Figure 4:
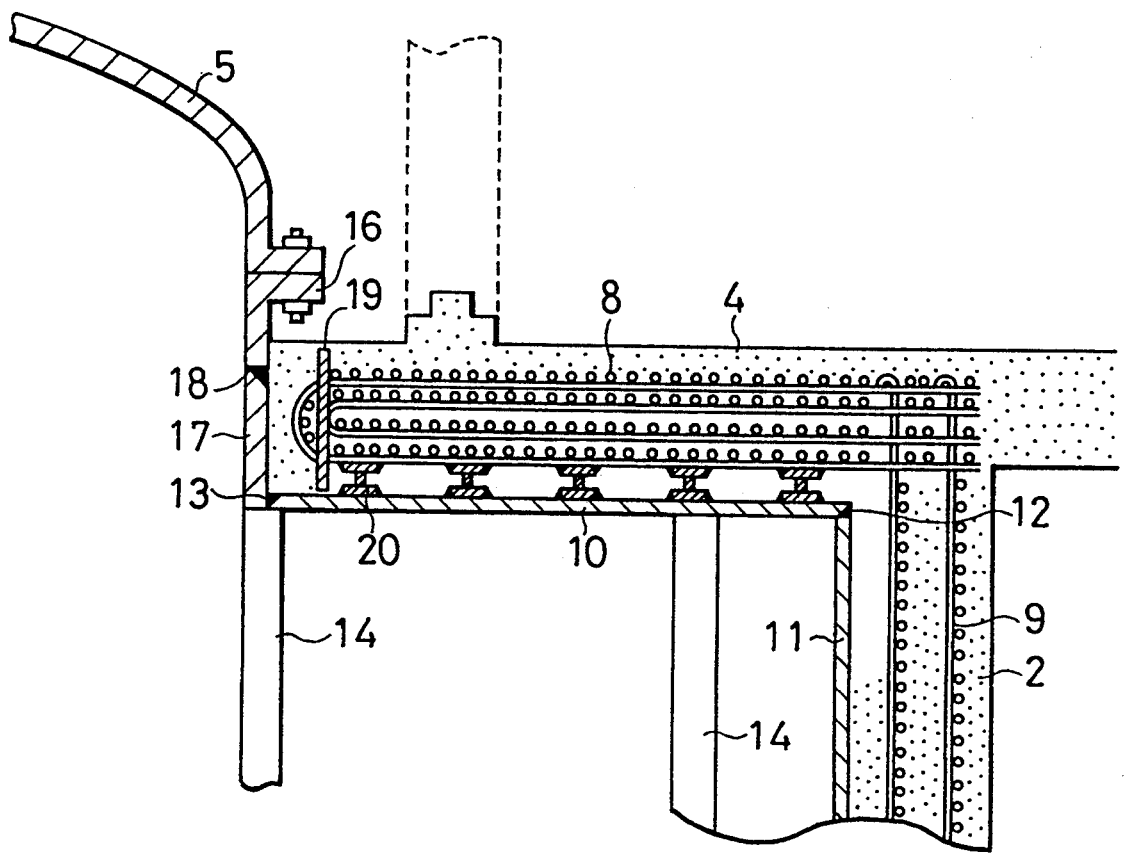
FIG. 4 is a vertical sectional view of a top slab of another embodiment of the present invention.
Figure 5:
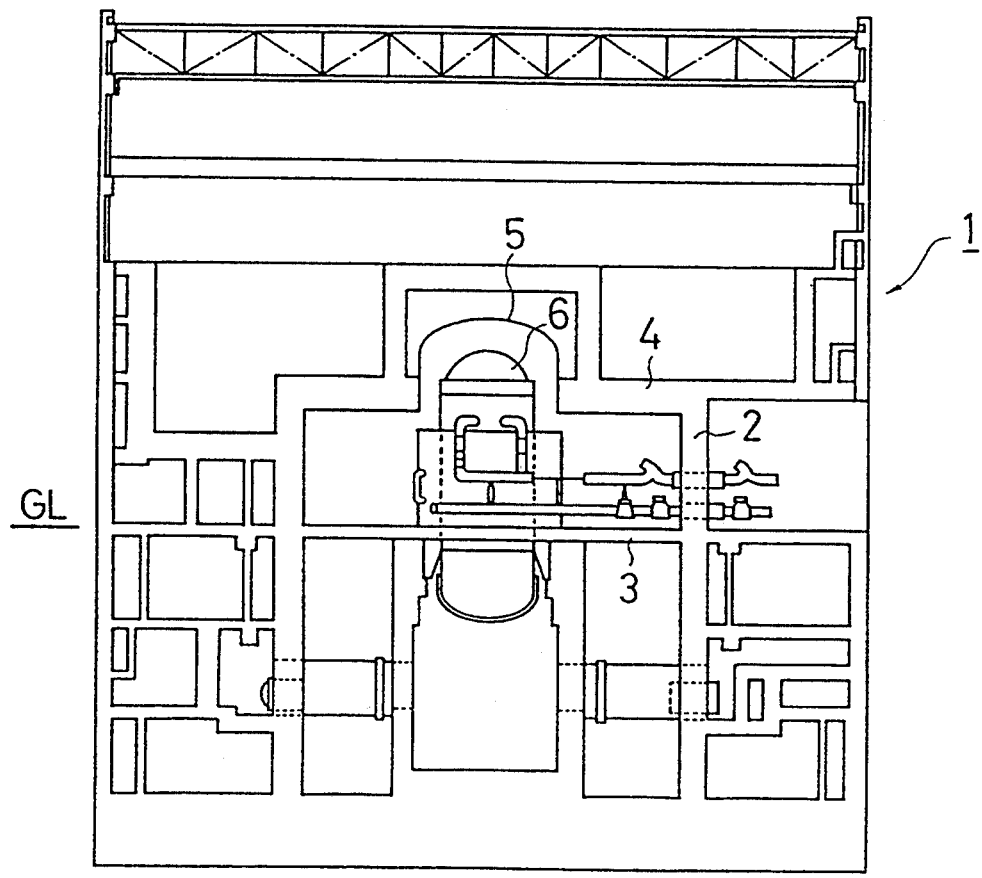
FIG. 5 is a vertical sectional view of the whole of a nuclear reactor container made of steel-reinforced concrete.
Figure 6:
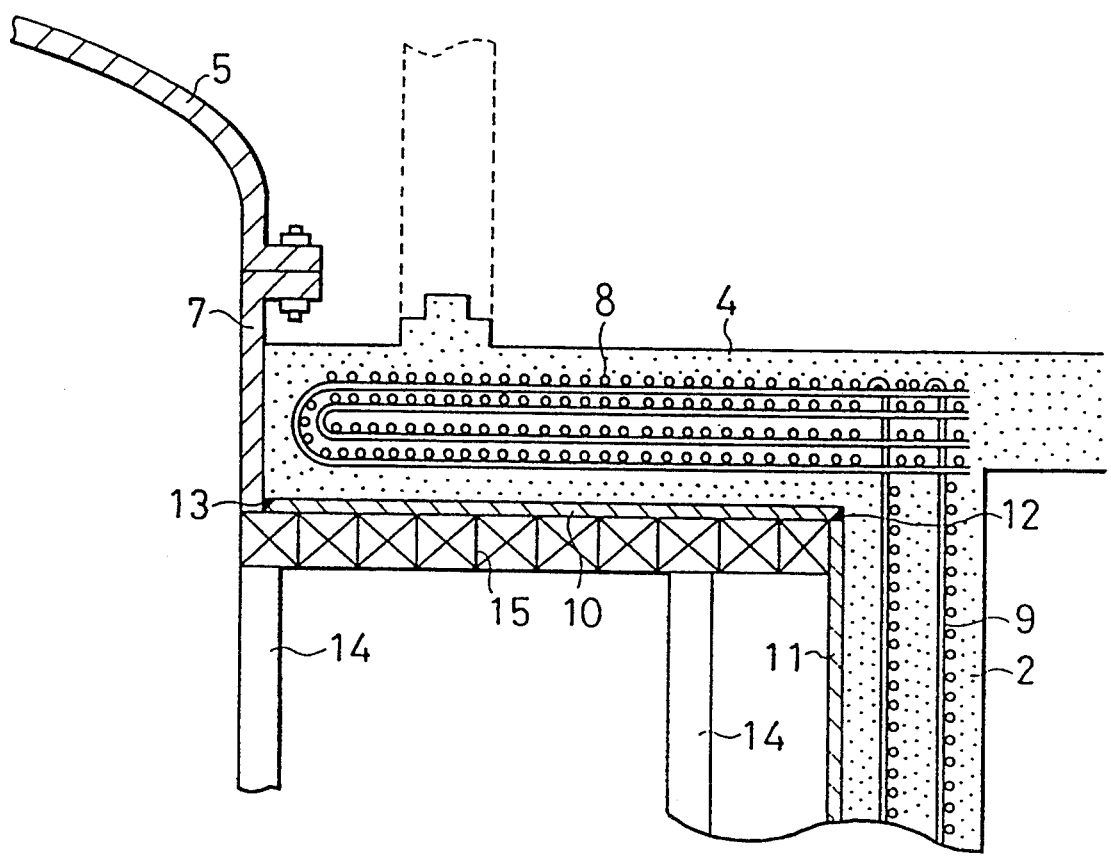
Fig. 6 is a vertical sectional view of a top slab structure of a known nuclear reactor container.
Figure 7:
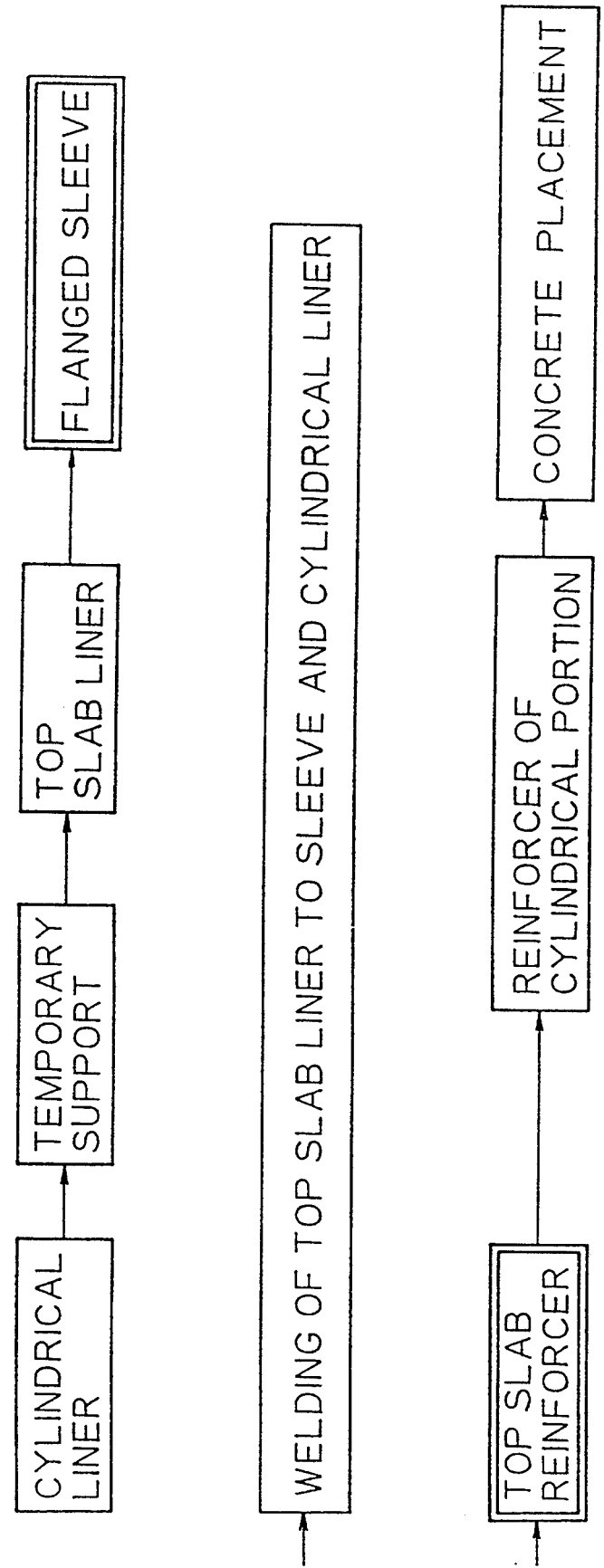
FIG. 7 is a flow chart illustrative of a conventional construction method.

Referring to FIG. 4, H-shaped steel bars 20 are laid on the upper surface of the top slab liner 10 and are fixed to the same by welding. Then, the steel reinforcement structure 8 is assembled on the H-shaped steel bars 20 and the lower end of the steel reinforcement structure 8 is welded to the upper surfaces of the H-shaped steel bars 20, whereby the steel reinforcement structure is integrated with the top slab liner 10. The sleeve 17 and the top slab liner 10 have been welded together along a welding line 13. In this embodiment, the top slab liner 10 functions as a reinforcer, so that the temporary trusses 15 shown in FIG. 2 can be eliminated.

Figure 8:
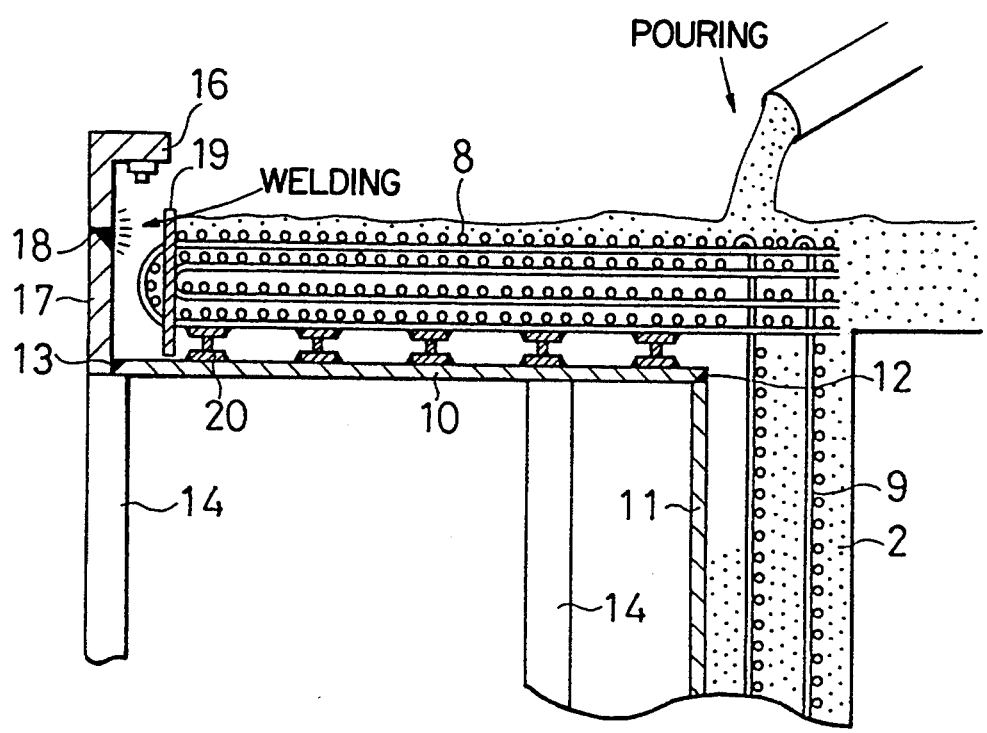
FIG. 8 is a vertical sectional view of a top slab structure like that in FIG. 4 showing the simultaneous welding and placement of concrete in the space on the outer diameter of the auxiliary plate.

Although each of the described embodiments employs an auxiliary plate 19 which is assembled together with the top slab steel reinforcement structure, the use of the auxiliary plate 19 is not essential. Without the auxiliary plate, the flange and the container sleeve must be welded before any concrete is poured. The use of the auxiliary plate 19, however, is preferred because the auxiliary plate stiffens the steel reinforcement structure so as to prevent deformation of this structure when the same is lifted for installation. The auxiliary plate also contributes to strengthening of the built-up nuclear reactor container. Additionally, the auxiliary plate acting as a barrier makes it possible to divide the placement of concrete whereby welding the flange and the container sleeve can be conducted on the inner diameter side of the auxiliary plate while pouring concrete into a space on the outer diameter side as shown schematically in FIG. 8.

As will be understood from the foregoing description, according to the invention, the flange is formed separately from the sleeve and is joined to the latter by welding. Therefore, construction of a nuclear reactor container having a flange of a diameter greater than the inside diameter of doughnut-shaped steel reinforcement structure can be conducted without difficulty by welding the flange to the sleeve after installation of the steel reinforcement structure, thus shortening the term of the construction work. In the embodiment in which the top slab steel reinforcement structure, top slab liner and the sleeve are integrated beforehand, the efficiency of the construction work is further improved because the temporary trusses can be omitted.

The installation of the above-mentioned integral structure can be facilitated by splitting the sleeve portion and the flange portion.

The cylindrical auxiliary plate prevents the welding line between the sleeve and the flange from being hidden by concrete so as to make it possible to simultaneously conduct the welding and the placement of concrete on the opposite side of the auxiliary plate. The auxiliary plate also strengthens the steel reinforcement structure so as to prevent deformation of this structure when the same is lifted for installation and also contributes to strengthening of the built-up nuclear reactor container.

What is claimed is:

1. A method of constructing a top slab of a nuclear reactor container having a sleeve with a flange and a prefabricated doughnut-shaped steel reinforcement structure wherein the outermost diameter of said flange is greater than the innermost diameter of said prefabricated doughnut-shaped steel-reinforcement structure, comprising the steps of:

placing a container sleeve separate from said flange, at a position where said top slab is to be constructed;

lifting said prefabricated doughnut-shaped steel reinforcement structure and placing this structure at a position where it forms said top slab; and welding said flange to said container sleeve for mounting a top head of said nuclear reactor container on said flange.

2. A method according to claim 1, wherein said prefabricated doughnut-shaped steel reinforcement structure has a cylindrical auxiliary plate integrated therewith and located near the innermost circumference of said prefabricated doughnut-shaped steel-reinforcement structure.

3. A method according to claim 2, wherein said welding said flange to said container sleeve is conducted simultaneously with pouring concrete in and solidifying the same on the outer diameter side of said cylindrical auxiliary plate, followed by pouring concrete in and solidifying the same on the inner diameter side of said cylindrical auxiliary plate, bounded by said container sleeve and said cylindrical auxiliary plate.

4. A method of constructing a top slab of a nuclear reactor container having a sleeve with a flange and a prefabricated doughnut-shaped steel reinforcement structure wherein the outermost diameter of said flange is greater than the innermost diameter of said prefabricated doughnut-shaped steel reinforcement structure, comprising the steps of:

prefabricating a structure integrating a top slab liner, a container sleeve, separate from said flange, fixed to the inner periphery of said top slab liner substantially orthogonal to said top slab liner, and said prefabricated doughnut-shaped steel reinforcement structure on said top slab liner, and lifting and mounting said prefabricated doughnut-shaped steel reinforcement structure to a position where said top slab is to be constructed; and welding said flange to said container sleeve for mounting a top head of said nuclear reactor container on said flange.

5. A method according to claim 4, wherein said prefabricated doughnut-shaped steel reinforcement structure has a cylindrical auxiliary plate integrated therewith and located near the innermost circumference of said prefabricated doughnut-shaped steel reinforcement structure.

6. A method according to claim 5, wherein welding said flange to the container sleeve is conducted simultaneously with pouring concrete in and solidifying the same on the outer diameter side of said cylindrical auxiliary plate, followed by pouring concrete in and solidifying the same on the inner diameter side of said cylindrical auxiliary plate, bounded by said container sleeve and said cylindrical auxiliary plate.

7. A nuclear reactor container, comprising:

a bottom-equipped cylindrical portion for containing a nuclear reactor therein:

a top slab provided on top of said cylindrical portion and composed of a doughnut-shaped steel reinforcement structure and concrete placed integrally with said doughnut-shaped steel reinforcement structure, said top slab having a central bore;

a container sleeve outlining said central bore of said top slab; and a flange fixed by welding to said container sleeve and said flange having its outermost diameter greater than the innermost diameter of said doughnut-shaped steel reinforcement structure; and a top head attached to said flange.

8. A nuclear reactor container according to claim 7, wherein a cylindrical auxiliary plate is integrated with said doughnut-shaped steel reinforcement structure near the innermost circumference thereof.

* * * * *